United States Patent
Yang et al.

(10) Patent No.: US 8,300,416 B2
(45) Date of Patent: Oct. 30, 2012

(54) ELECTRONIC DEVICE WITH TWO ELECTRONIC MEMBERS ROTATABLY AND SLIDABLY COUPLED TO EACH OTHER

(75) Inventors: Xin Yang, Shenzhen (CN); Wei Wu, Shenzhen (CN); Hua Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 359 days.

(21) Appl. No.: 12/632,818

(22) Filed: Dec. 8, 2009

(65) Prior Publication Data

US 2011/0051327 A1 Mar. 3, 2011

(30) Foreign Application Priority Data

Aug. 26, 2009 (CN) .......................... 2009 1 0306134

(51) Int. Cl.
*H05K 5/03* (2006.01)

(52) U.S. Cl. ........ 361/755; 361/756; 361/801; 361/802; 361/803; 361/679.01; 455/575.1; 455/575.2; 455/575.3; 455/575.4

(58) Field of Classification Search .... 455/575.1–575.4; 361/679.01, 755, 756, 801–803
See application file for complete search history.

(56) References Cited

U.S. PATENT DOCUMENTS

| | | | | |
|---|---|---|---|---|
| 5,494,447 A * | 2/1996 | Zaidan | ............................. | 439/31 |
| 5,666,273 A * | 9/1997 | Kurcbart | ........................ | 361/814 |
| 6,016,176 A * | 1/2000 | Kim et al. | ........................ | 349/84 |
| 6,208,874 B1 * | 3/2001 | Rudisill et al. | ............. | 455/575.4 |
| 7,019,964 B1 * | 3/2006 | Maskatia et al. | ......... | 361/679.27 |
| 7,187,538 B2 * | 3/2007 | Homer et al. | ............. | 361/679.21 |
| 2002/0071550 A1 * | 6/2002 | Pletikosa | .................. | 379/433.01 |
| 2003/0109230 A1 * | 6/2003 | Duarte et al. | ................... | 455/90 |
| 2007/0206349 A1 * | 9/2007 | Jacobs | .......................... | 361/683 |
| 2009/0054114 A1 * | 2/2009 | Ozawa | ........................ | 455/575.4 |
| 2011/0141679 A1 * | 6/2011 | Dai et al. | .................. | 361/679.27 |

* cited by examiner

*Primary Examiner* — Hung S Bui
*Assistant Examiner* — James Wu
(74) *Attorney, Agent, or Firm* — Altis Law Group, Inc.

(57) ABSTRACT

An electronic device includes a cover, a body, and two sliding members. The body includes a first surface, a second surface opposite to the first surface, and two sliding slots. Each sliding slot extends along the first surface to the second surface. The two sliding members are pivotally coupled to the cover. The cover is rotatably and slidably coupled to the body by the two sliding members engaging with the two sliding slots, and is capable of sliding along the two sliding slots from the first surface to the second surface.

2 Claims, 8 Drawing Sheets

ELECTRONIC DEVICE WITH TWO ELECTRONIC MEMBERS ROTATABLY AND SLIDABLY COUPLED TO EACH OTHER

BACKGROUND

1. Technical Field

The disclosure generally relates to electronic devices, and particularly to a portable electronic device having a touch sensitive display.

2. Description of Related Art

Portable electronic devices, such as foldable laptop computers, are in widespread use. Keyboards are provided to receive user inputs. Recently, however, many laptop computers include touch sensitive displays. Users can touch/contact the touch sensitive displays for inputs. Conventional access to the touch sensitive display and keyboard is to flip open the touch sensitive display to expose the display and keyboard. This is an inconvenience. Therefore, there is room for improvement in the art.

BRIEF DESCRIPTION OF THE DRAWINGS

The components of the drawings are not necessarily drawn to scale, the emphasis instead being placed upon clearly illustrating the principles of the embodiments of an electronic device. Moreover, in the drawings, like reference numerals designate corresponding parts throughout several views.

DETAILED DESCRIPTION

Figure 1:
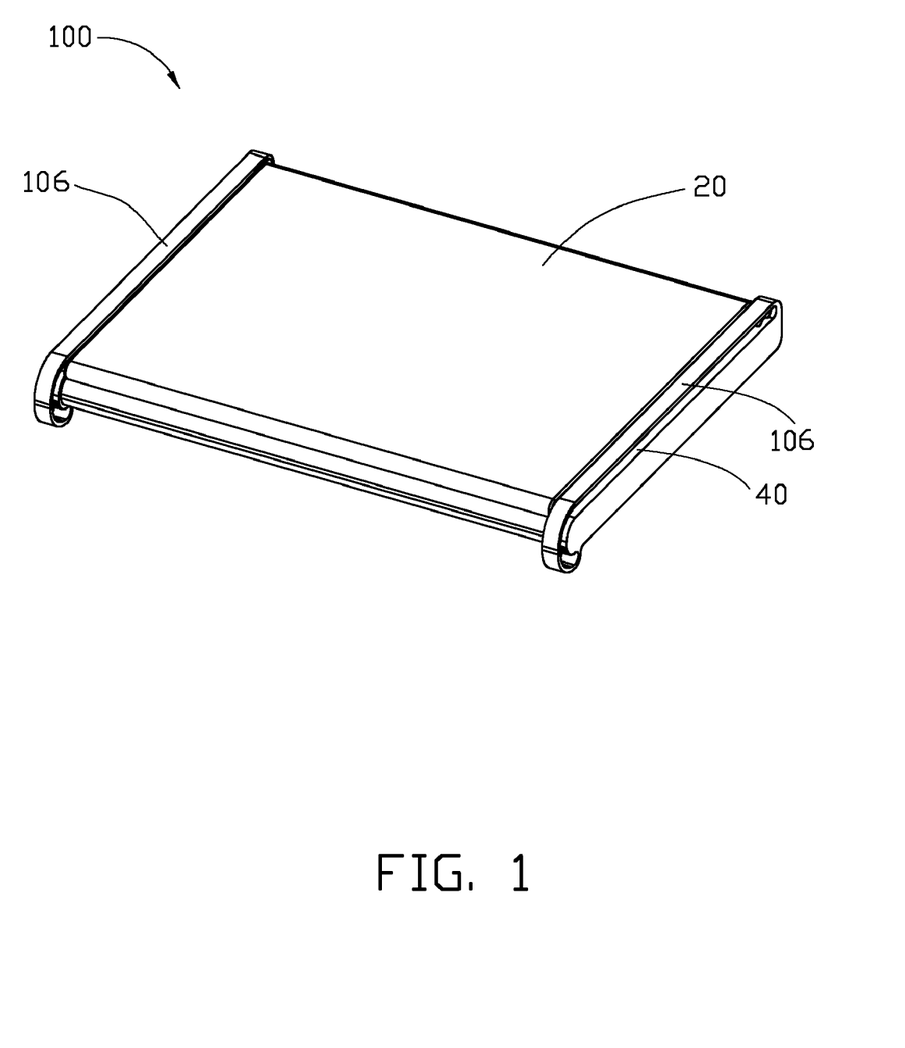
FIG. 1 is a perspective view of an electronic device capable of being used in a first fashion and in a second fashion in accordance with one embodiment.
Figure 2:
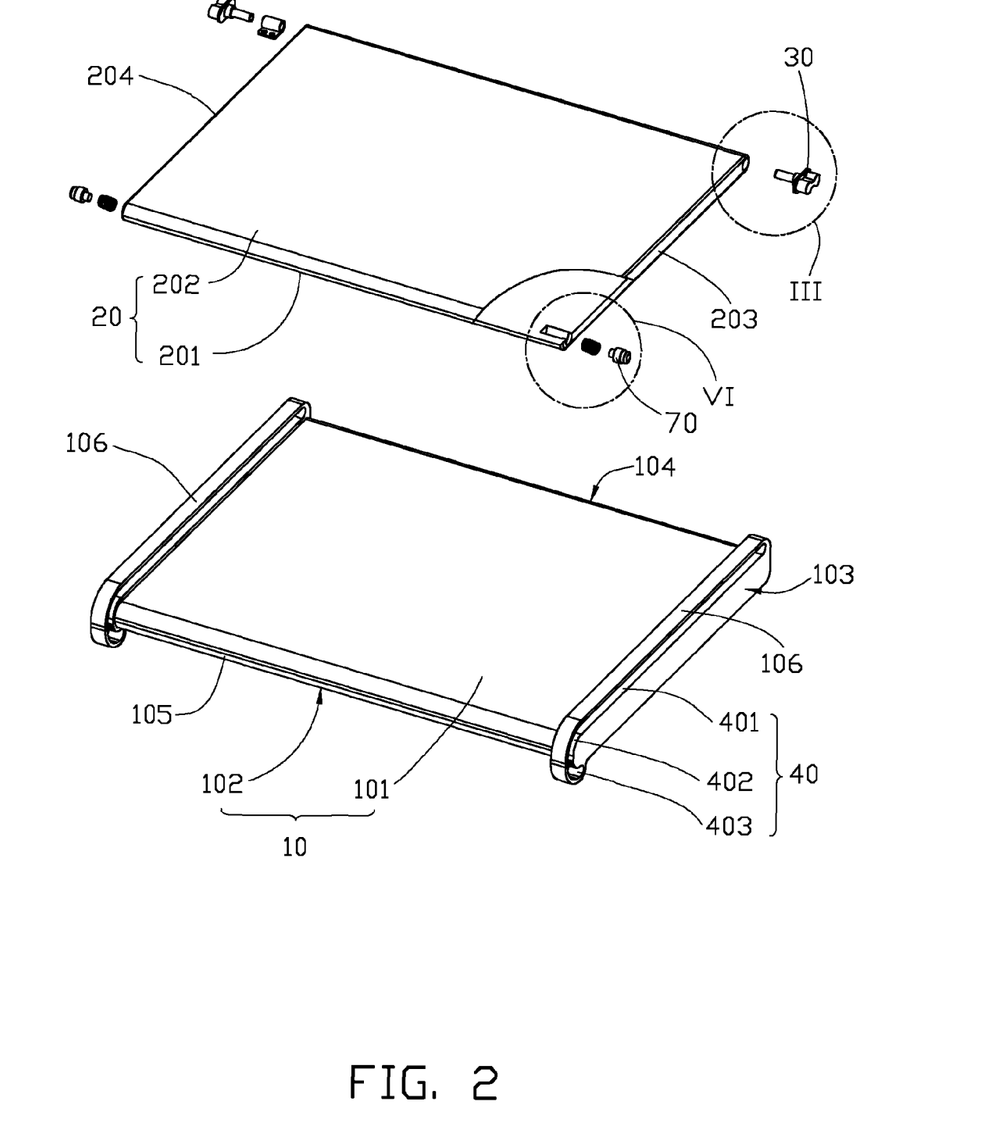
FIG. 2 is an exploded view of the electronic device of FIG. 1.

Referring to FIGS. 1-2, a portable electronic device 100 is shown. The portable electronic device 100 includes a body 10, a cover 20, and two joint members 30. The cover 20 is rotatably and slidably coupled to the body 10 via the two joint members 30.

Figure 8:
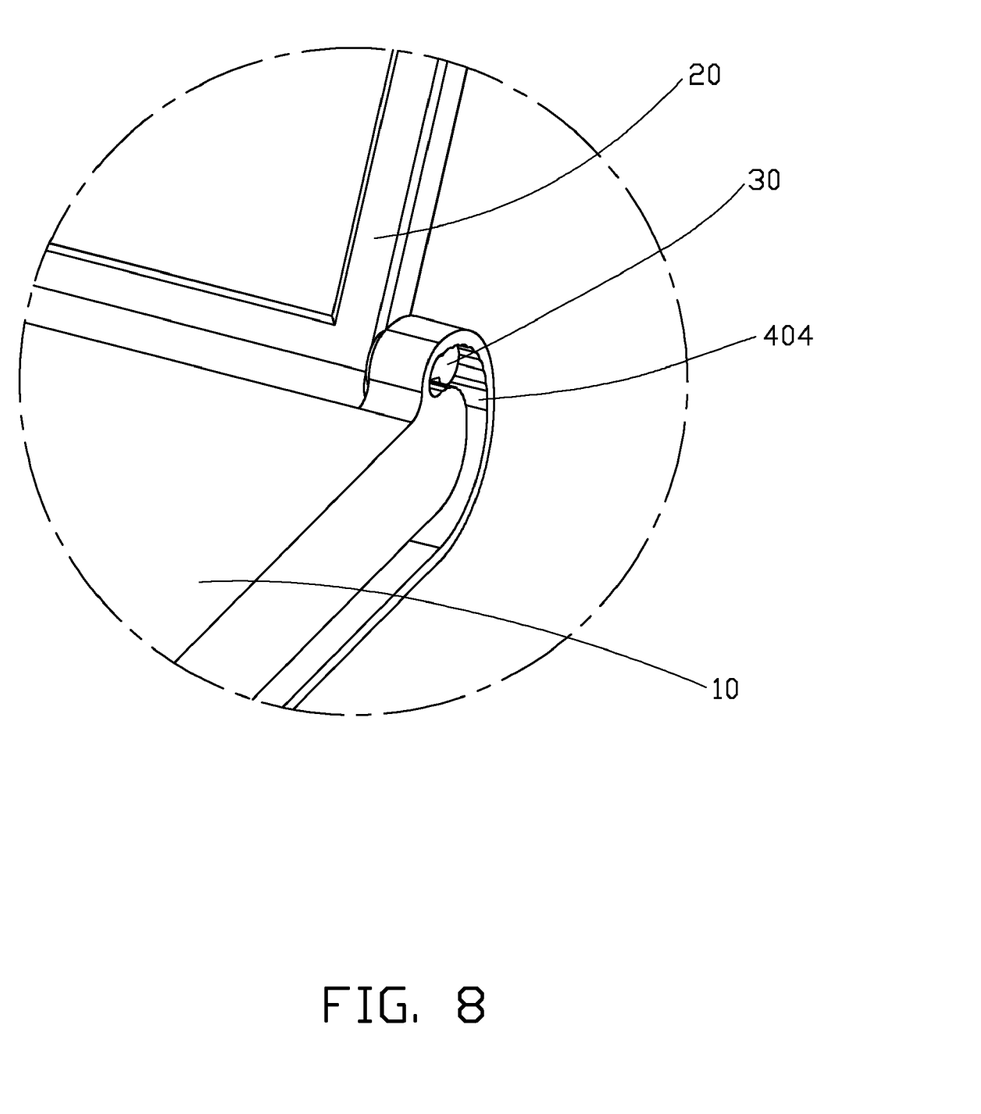
FIG. 8 is a sectional view enlarging VII portion in the electronic device shown in FIG. 7.

The body 10 includes an upper surface 101, a bottom surface 102, two planar sidewalls 103, two curved sidewalls 104, 105, and two sliding rails 106. The planar sidewalls 103 are perpendicular to the curved sidewalls 104, 105. One end of the two sliding rails 106 are connected to two rims on opposite sides of the upper surface 101 adjacent to the planar sidewalls 103 and the other end of the two sliding rails 106 are connected to two rims on opposite sides of the bottom surface 102 adjacent to the planar sidewalls 103. Two J-shaped sliding slots 40 are defined between the two sliding rails 106 and the upper surface 101 and the bottom surface 102 correspondingly. Each J-shaped sliding slot 40 includes a first portion 401, a second portion 402, and a third portion 403. The second portion 402 communicates with the first portion 401 and with the third portion 403. The first portion 401 extends along the rim of the upper surface 101 in a direction away from the curved sidewall 104 and toward the curved sidewall 105. The second portion 402 partially wraps around the curved sidewall 105. The third portion 403 extends along a partial rim of the bottom surface 102 in a direction from the curved sidewall 105 toward the curved sidewall 104. Referring also to FIG. 8, a plurality of protrusions 404 protrude inwardly from inner surfaces of the third portion 403 and a part of the second portion 402.

Figure 7:
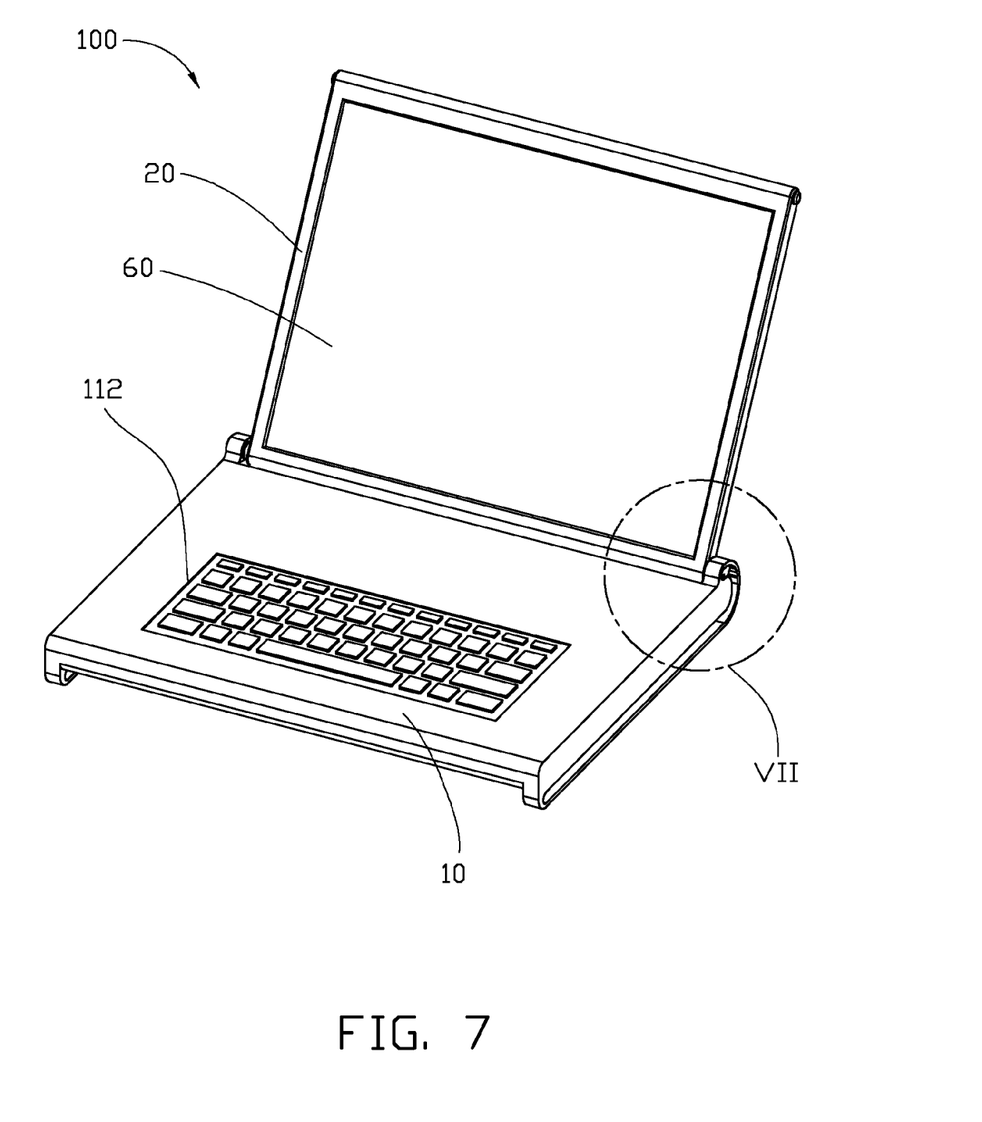
FIG. 7 is a perspective view of the electronic device of FIG. 1, when the electronic device is used in a second fashion.

Referring to FIG. 7, an input device 112 is fixed to the bottom surface 102 of the body 10. The input device 112 is configured for receiving user inputs. In the embodiment, the input device 112 is a keyboard.

Figure 6:
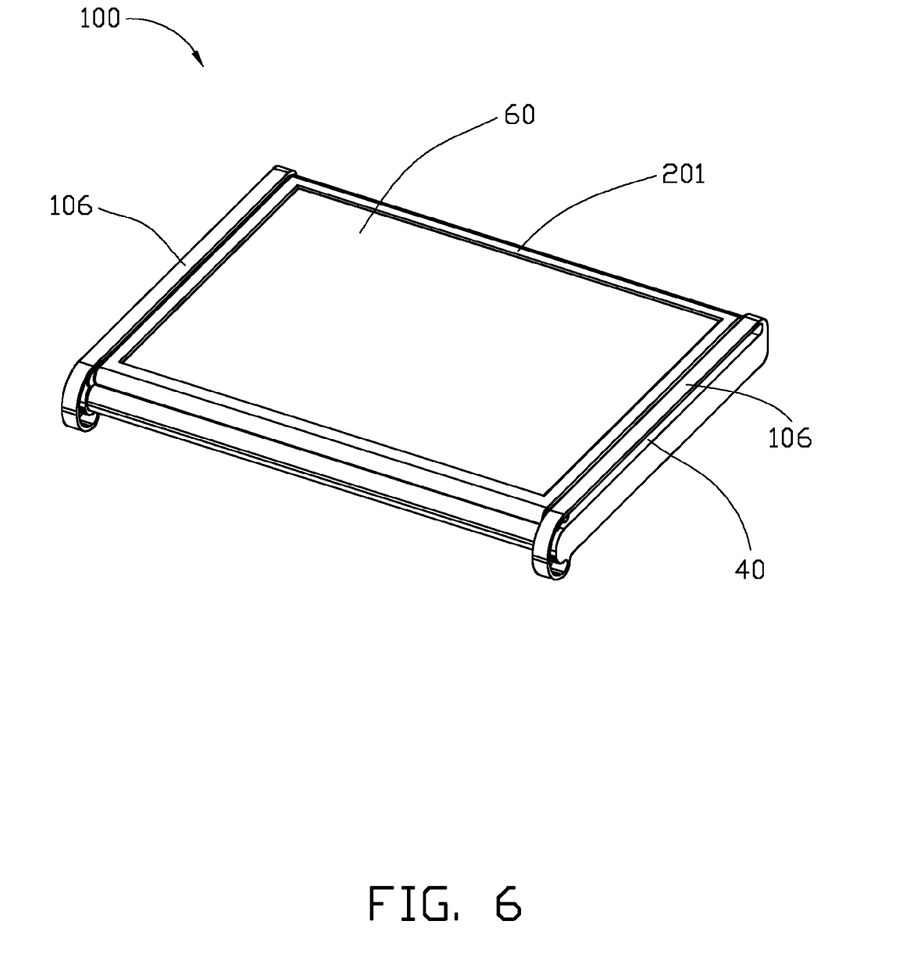
FIG. 6 is a perspective view of the electronic device of FIG. 1, when the electronic device is used in a first fashion.

Referring back to FIG. 2, the cover 20 includes a first surface 201, a second surface 202, and two side surfaces 203, 204. The first surface 201 is substantially parallel to the second surface 202. The first and second surfaces 201, 202 are perpendicular to the side surfaces 203, 204. Two sliding members 30 are rotatably coupled to the two side surfaces 203, 204 correspondingly. Two latching members 70 are mounted to the side surfaces 203, 204 correspondingly. The two latching members 70 and the two sliding members 30 are disposed at opposite ends of the side surfaces 203, 204 correspondingly. Referring to FIGS. 6-7, a display 60 is fixed to the first surface 201. In the embodiment, the display 60 is a touch sensitive display.

Figure 3:
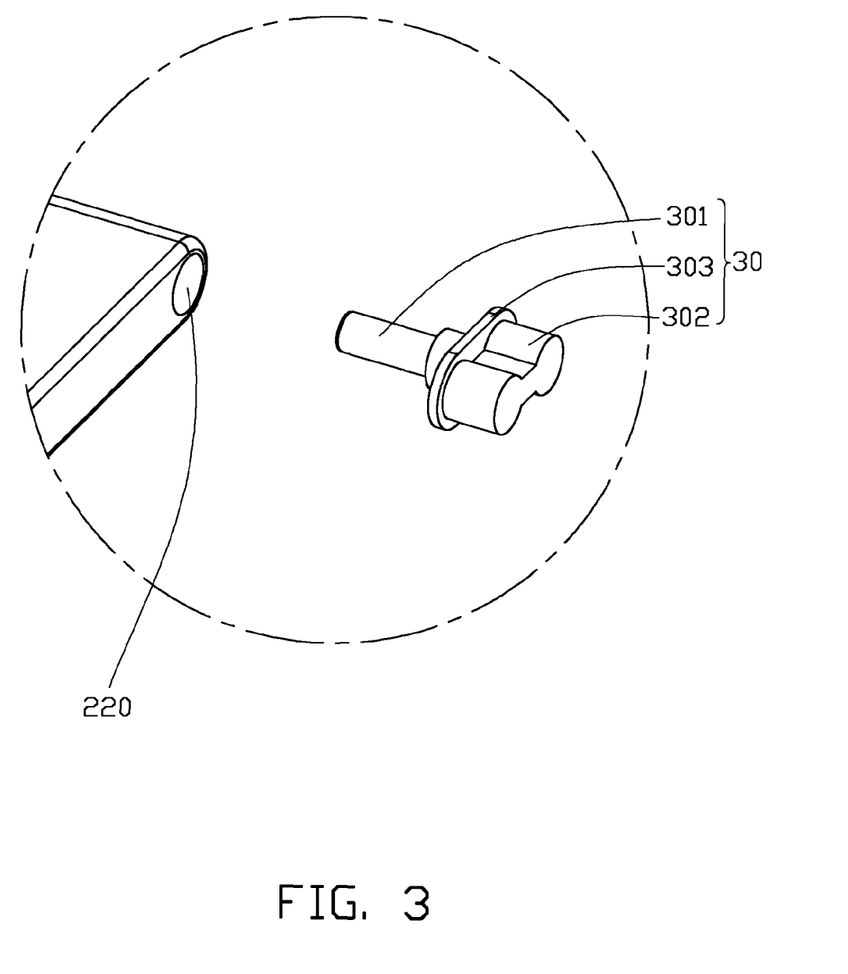
FIG. 3 is a sectional view enlarging III portion in the electronic device shown in FIG. 2.
Figure 4:
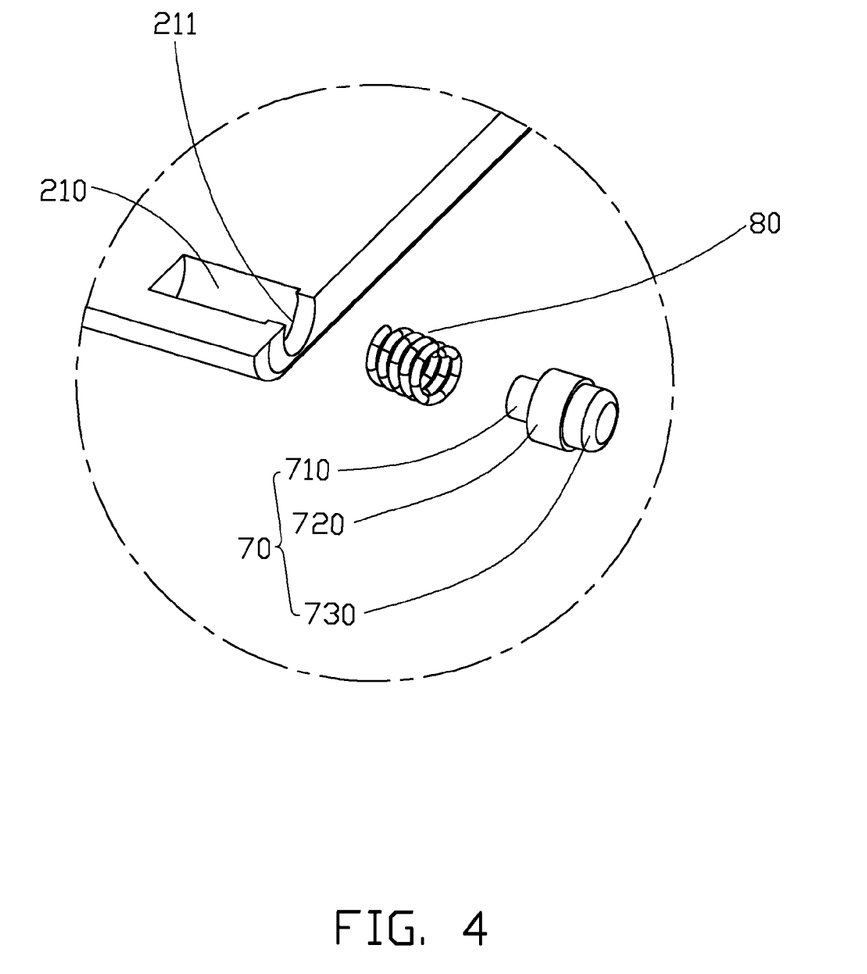
FIG. 4 is a sectional view enlarging VI portion in the electronic device shown in FIG. 2.

Referring to FIGS. 3-4, one end of the side surface 203 defines a round hole 220. The other end of the side surface 203 defines a through hole 211. The cover 20 further defines two tubular recesses 210 at opposite sides of the round hole 220. The tubular recesses 210 communicate with the through holes 211 correspondingly. The tubular recesses 210 are configured to receive the latching members 70. The round holes 220 are configured to receive the sliding members 30.

The sliding member 30 includes a pivot rod 301, a guiding post 302, and an elliptic limiting portion 303. The limiting portion 303 joins the pivot rod 301 to the guiding post 302. The pivot rod 301 and the guiding post 302 are perpendicular to the limiting portion 303. The guiding post 302 is substantially 8-shaped. The pivot rod 301 is rotatably received in the round hole 220, such that the sliding member 30 is rotatable relative to the cover 20. The width of the limiting member 303 is wider than that of the sliding slot 40. The width of the guiding post 302 is slightly narrower than that of the sliding slot 40. It should be noted that in assembly, when the pivot rod 301 engages with the round hole 220, a desired force of sliding friction is generated, such that the cover 20 can remain at a desired angular position relative to the body 10.

The latching member 70 includes a columnar post 710, a columnar connecting post 720, and a columnar latching post 730. The diameter of the columnar connecting post 720 is larger than that of the columnar latching post 730. The diameter of the through hole 211 is slightly larger than that of the latching post 730 but is smaller than that of the connecting post 720.

The portable electronic device 100 further includes two elastic elements 80. The elastic elements 80 are received in the tubular recesses 210 correspondingly. In the embodiment, the elastic elements 80 are spiral springs. The diameter of the elastic element 80 is larger than that of the through hole 211. The length of the elastic element 80 is slightly less than that of the round recess 210. It should be noted that in assembly, the elastic element 80 is sleeved on the columnar post 710, the columnar post 710 and the connecting post 720 are accommodated in the round recess 210, and the latching post 730 extends out of the through hole 211 when the latching post 730 is at rest. The latching post 730 is inserted in the through hole 211 and the connecting post 720 presses the elastic element 80 when the latching post 730 is pressed.

In assembly, the sliding members 30 are rotatably coupled to the cover 20 by inserting the pivot rods 301 in the round holes 220 correspondingly. The guiding posts 302 of the sliding members 30 are further received in the sliding slots 40, such that the cover 20 is sandwiched between the two sliding rails 106 and is slidable relative to the sliding slots 40.

After assembly, because the limiting member 303 is perpendicular to the guiding post 302, and the width of the limiting member 303 is larger than that of the sliding slot 40, the cover 20 is slidable in a parallel direction to the sliding slots 40. Because the latching posts 730 are extendable out of and being inserted in the through hole 211, the cover 20 is latched to the body 10 while the latching posts 730 extend out of the through holes 211 and are received in the sliding slots 40, and is unlatched from the body 10 while the latching posts 730 are inserted in the through hole 211. Furthermore, as a plurality of protrusions 404 protrude from the inner surface of the second portion 402 and a part of the third portion 403, thus, the 8-shaped guiding post 302 is retained in the third portion 403.

Figure 5:
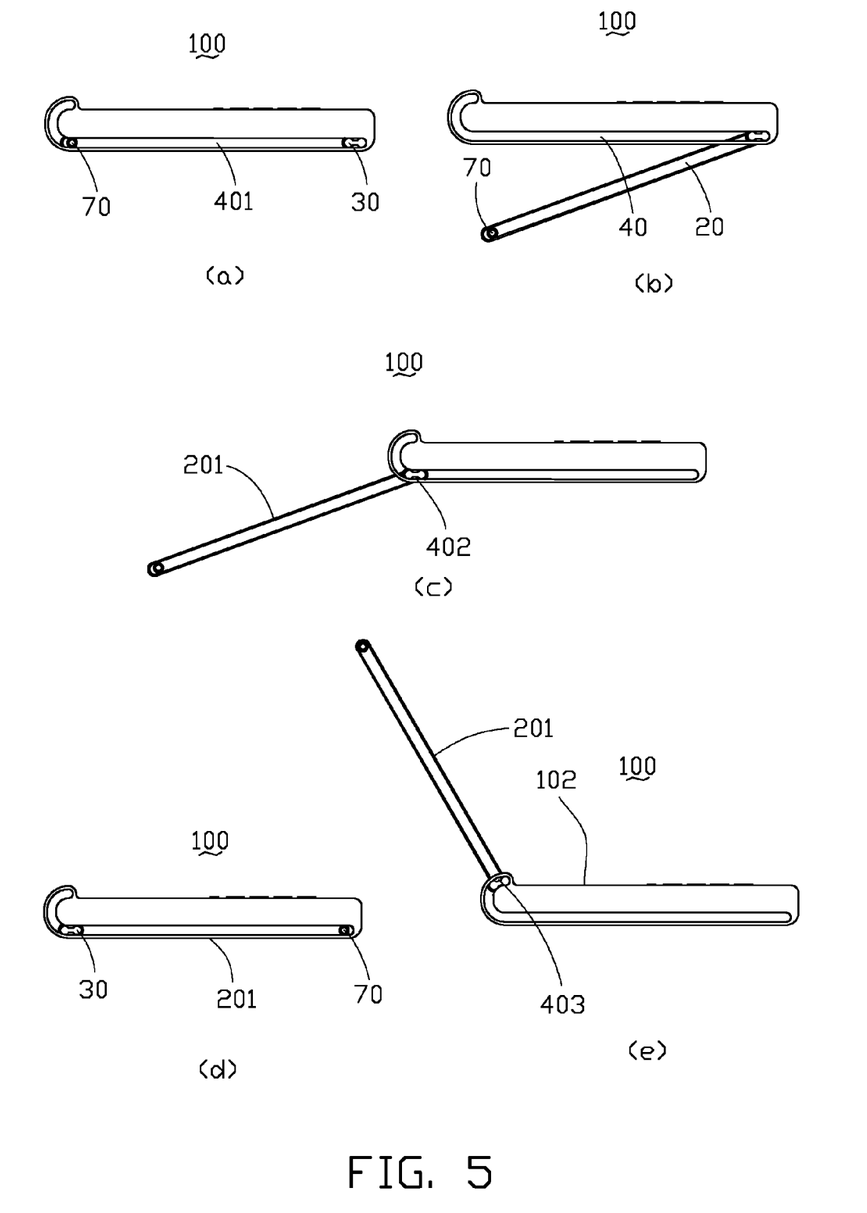
FIG. 5 is an explanatory view showing five states of the electronic device of FIG. 1 in use.

Referring to FIG. 5(a), the portable electronic device 100 is shown in a locked state. In the locked state, the guiding posts 302 received in the sliding slots 40 and disposed at an end thereof away from the curved sidewall 10. The latching posts 730 extend out of the through holes 211 and are received in the sliding slots 40 correspondingly. The cover 20 is latched to and against the body 10, and the display 60 fixed to the cover 20 is protected.

Referring to FIG. 5(b), the cover 20 is unlatched from the body 10 by operating the latching member 70, as a result, the cover is rotatably flipped opened and is slidable along the sliding slots 40. Referring also to FIGS. 5(c), 5(d), and FIG. 6, when the cover 20 slides to an end of the first portion 401 adjacent to the second portion 402, the cover 20 is rotated to latch the latching member 70 at the end of the first portion 401 away from the second portion 402, the cover 20 folds over on the body 10 again with the display 60 exposed. As a result, the electronic device 100 can be used as a panel electronic device, and the display 60 is operated as an input device to receive touch inputs and also as an output device to display information.

Referring to FIGS. 5(c), 5(e) and FIGS. 7-8, the cover 20 slides pass the first portion 401 and the second portion 402, and stops at the third portion 403. As a result, when the cover 20 is further rotated toward the keyboard 112, the electronic device 100 can be used as a foldable electronic device, the display 60 is used as a display device, and the input device 112 is used to receive user input operations.

When the electronic device 100 is not being used, the sliding member 30 can be moved to the end of the sliding slots 40 away from the second portion 402. Then, the latching member 70 is operated to latch the cover 20 to the sliding slots 40. Thus, the display 60 is shielded and is protected.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device, comprising:
   a cover comprising a display surface;
   at least two latching members being fixed to the cover;
   a body comprising a first surface and at least two rails protruding from the first surface for defining at least two sliding slots; and
   at least two sliding members engaging with the at least two sliding slots for rotatably and slidably coupling the cover to the body;
   wherein the cover is capable of being operated to slide along the at least two sliding slots from a first end to a second end of the first surface, the cover is foldable with the body with the display surface covering the first surface, and when the display surface is covering the first surface, at the first end the cover is latched to the second end of the first surface by the latching members; and at the second end the cover is rotatable around the sliding member with an opposite surface of the cover opposite to the display surface being rotated towards and facing towards the first surface, and with the display surface facing away from the first surface, when the cover is rotated around the sliding member to make the display surface to face away from the first surface, the latching members latched the cover to the first end of the first surface.

2. The electronic device of claim 1, wherein the electronic device comprises two latching members respectively arranged at two opposite ends of a side of the cover perpendicular to the at least two sliding slots, and further comprises two sliding members respectively arranged at two opposite ends of another side of the cover perpendicular to the at least two sliding slots.

* * * * *